United States Patent
Grant

(10) Patent No.: US 12,202,384 B2
(45) Date of Patent: Jan. 21, 2025

(54) REVOLVEABLE DOOR CHAIR FOR A VEHICLE

(71) Applicant: GM Global Technology Operations LLC, Detroit, MI (US)

(72) Inventor: Douglas Anthony Grant, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 344 days.

(21) Appl. No.: 17/901,180

(22) Filed: Sep. 1, 2022

(65) Prior Publication Data
US 2024/0075849 A1 Mar. 7, 2024

(51) Int. Cl.
| | | |
|---|---|---|
| B60N 2/01 | (2006.01) | |
| B60J 5/04 | (2006.01) | |
| B60N 2/02 | (2006.01) | |
| B60N 2/14 | (2006.01) | |
| B60N 2/24 | (2006.01) | |

(52) U.S. Cl.
CPC ............... *B60N 2/012* (2013.01); *B60J 5/04* (2013.01); *B60N 2/14* (2013.01); *B60N 2002/022* (2013.01); *B60N 2/245* (2013.01)

(58) Field of Classification Search
CPC .......... A61G 5/00; A61G 5/08; A61G 5/0891; B60N 2/012; B60N 2/14; B60N 2/245; B60N 2002/022; B60N 2/0256; B60J 5/04; B60J 5/0493
See application file for complete search history.

(56) References Cited

U.S. PATENT DOCUMENTS

| | | | | | |
|---|---|---|---|---|---|
| 4,113,307 A | * | 9/1978 | Day | ........................ | B64F 1/315 297/183.2 |
| 4,728,119 A | * | 3/1988 | Sigafoo | .................. | A61G 3/063 297/440.16 |
| 5,746,465 A | * | 5/1998 | Jones | ........................ | B60N 2/14 297/344.13 |

FOREIGN PATENT DOCUMENTS

| | | | | |
|---|---|---|---|---|
| CN | 204580562 U | * | 8/2015 | |
| GB | 2069969 A | * | 9/1981 | ............. A61G 3/062 |
| JP | 2001347859 A | * | 12/2001 | ............. A61G 3/062 |

OTHER PUBLICATIONS

CN 203888813 U includes English translation (Year: 2014).*

* cited by examiner

*Primary Examiner* — Lori Lyjak
(74) *Attorney, Agent, or Firm* — CANTOR COLBURN LLP

(57) ABSTRACT

A revolveable door chair for a vehicle includes a support frame including a base, a side member extending upwardly from the base, and a chair support. The side member is pivotally mounted to a vehicle support. A ground support leg is pivotally connected to the base. A chair is positioned in the support frame. The chair rests in the chair support.

20 Claims, 5 Drawing Sheets

REVOLVEABLE DOOR CHAIR FOR A VEHICLE

INTRODUCTION

The subject disclosure relates to the art of vehicles and, more particularly, to a revolveable seat door for a vehicle.

Most vehicle seats can be placed in one of three categories. Step up and into the seat, step over and into the seat, or step down and into the seat. Regardless of the category, a person entering a vehicle has to move through a doorway into the seat. While this effort is not a problem for many, 1 in 4 people suffer some form of disability which makes entering a vehicle painful or difficult. Accordingly, it is desirable to provide a vehicle seat that reduces strain on the person entering the vehicle.

SUMMARY

A revolveable door chair for a vehicle, in accordance with a non-limiting example, includes a support frame including a base, a side member extending upwardly from the base, and a chair support. The side member is pivotally mounted to a vehicle support. A ground support leg is pivotally connected to the base. A chair is positioned in the support frame. The chair rests in the chair support.

In addition to one or more of the features described herein the chair support includes a front chair support member, a rear chair support member, and a first side support member extending between and connecting the front chair support member and the rear chair support member.

In addition to one or more of the features described herein the front chair support member is spaced from the base a first distance and the rear chair support member is spaced from the base a second distance that is greater than the first distance.

In addition to one or more of the features described herein the support frame includes a second side support member spaced from the first side support member, the second side support member extending between the front chair support member and the rear chair support member.

In addition to one or more of the features described herein the first side support member is spaced from the base a first distance and the second side support member is spaced from the base a second distance, the second distance being greater than the first distance.

In addition to one or more of the features described herein the chair rests on the front chair support member, the rear chair support member, and the first side support member.

In addition to one or more of the features described herein the chair includes a seat portion and a back portion, the second side support member projecting upwardly beyond the seat portion.

In addition to one or more of the features described herein the chair includes a first side bolster and a second side bolster that project outwardly of the back portion.

In addition to one or more of the features described herein the ground support leg includes a wheel.

In addition to one or more of the features described herein the support frame includes a lock member that selectively secures the revolveable door chair in the vehicle.

A vehicle, in accordance with a non-limiting example, includes a body including a passenger compartment and a support pillar. A plurality of wheels support the body. A revolveable door chair is pivotally supported in the passenger compartment. The revolveable door chair is selectively rotatable from a first position wherein the revolveable door chair resides inside the body and a second position, wherein the revolveable door chair resides outside of the body. The revolveable door chair includes a support frame including a base, a side member extending upwardly from the base, and a chair support. The side member is pivotally mounted to a vehicle support. A ground support leg is pivotally connected to the base. A chair is positioned in the support frame. The chair rests in the chair support.

In addition to one or more of the features described herein the chair support includes a front chair support member, a rear chair support member, and a first side support member extending between and connecting the front chair support member and the rear chair support member.

In addition to one or more of the features described herein the front chair support member is spaced from the base a first distance and the rear chair support member is spaced from the base a second distance that is greater than the first distance.

In addition to one or more of the features described herein the support frame includes a second side support member spaced from the first side support member, the second side support member extending between the front chair support member and the rear chair support member.

In addition to one or more of the features described herein the first side support member is spaced from the base a first distance and the second side support member is spaced from the base a second distance, the second distance being greater than the first distance.

In addition to one or more of the features described herein the chair rests on the front chair support member, the rear chair support member, and the first side support member.

In addition to one or more of the features described herein the chair includes a seat portion and a back portion, the second side support member projecting upwardly beyond the seat portion.

In addition to one or more of the features described herein the chair includes a first side bolster and a second side bolster that project outwardly of the back portion.

In addition to one or more of the features described herein the ground support leg includes a wheel.

In addition to one or more of the features described herein the support frame includes a lock member that selectively secures the revolveable door chair in the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
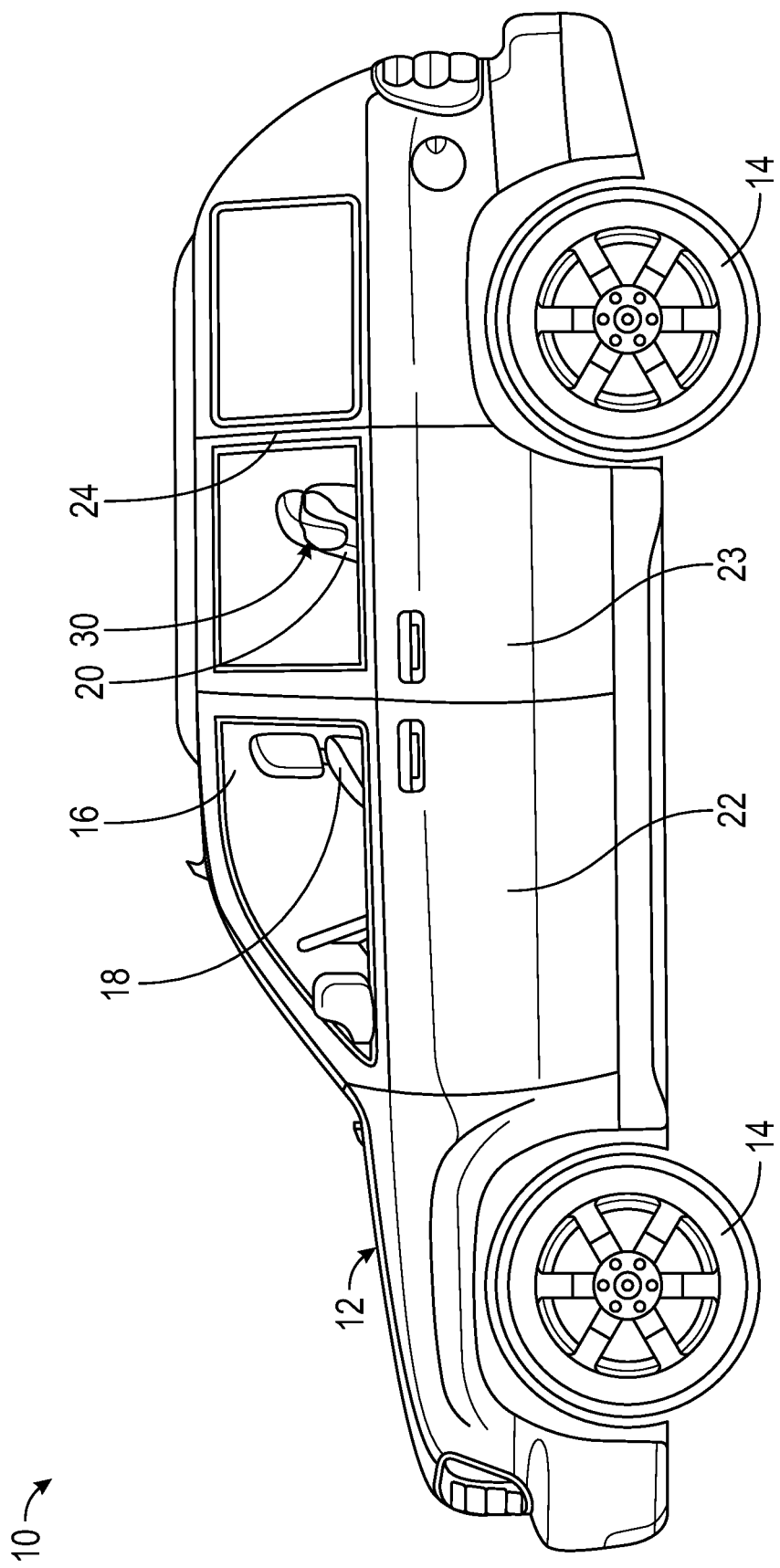
FIG. 1 is a side view of a vehicle including a revolveable door chair, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels two of which are indicated at 14. Body 12 defines, in part, a passenger compartment 16 within which is arranged a driver's seat 18 and a passenger seat 20. Driver's seat 20 is accessed through a driver's side door 22 and passenger seat 20 is accessed through a rear passenger door 23.

In FIG. 1, passenger seat 20 is depicted as a rear passenger seat mounted to a support pillar 24 as will be detailed herein. That is, in a non-limiting example rear passenger seat 20 takes the form of a revolveable door chair 30. It should be understood at this point that while shown as a left rear passenger seat, revolveable door chair 30 may be placed on an opposite side of vehicle 10 as a front passenger seat and/or a rear passenger seat.

Figure 2:
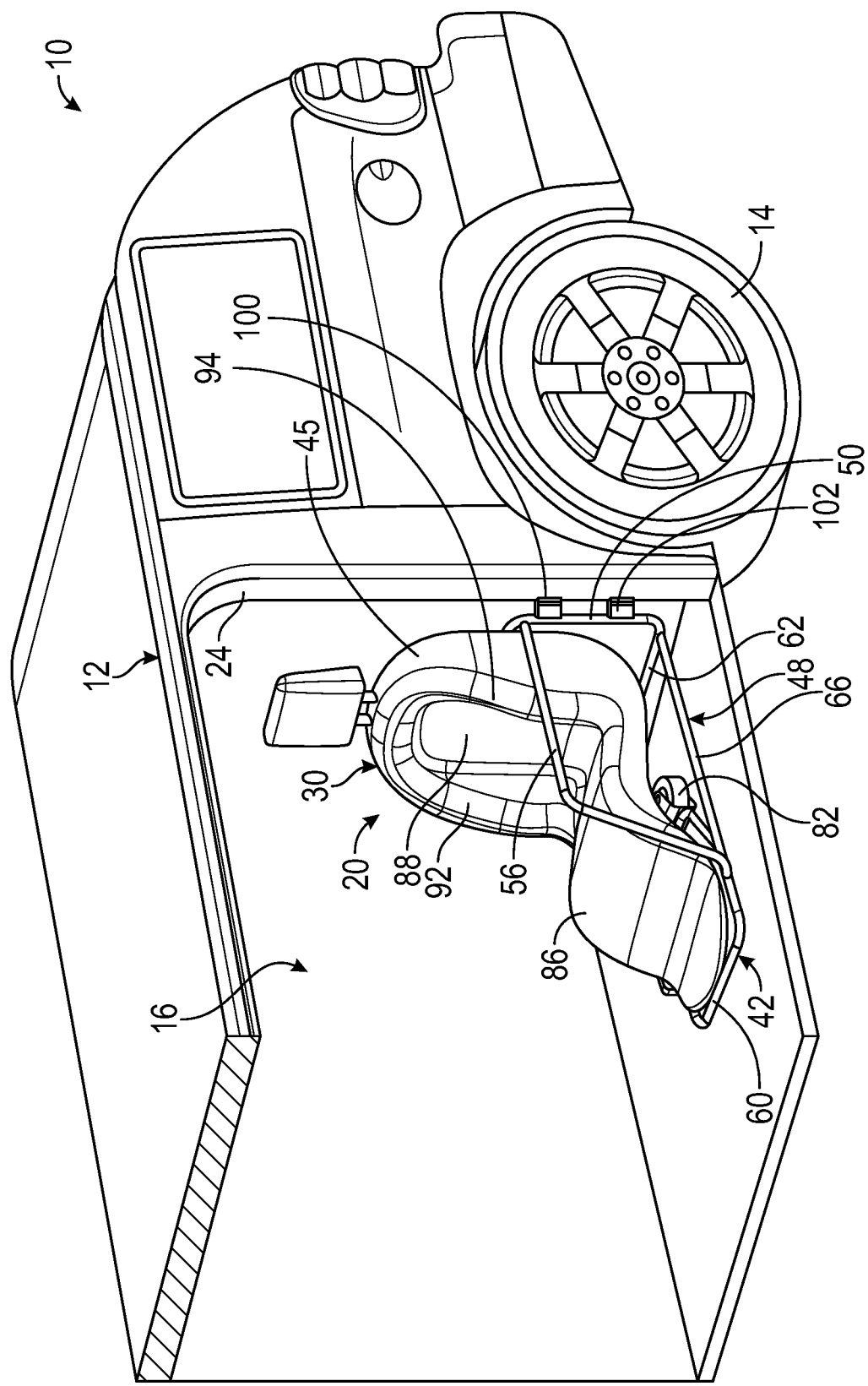
FIG. 2 is a side partially disassembled view of the revolveable door chair in a first configuration, in accordance with a non-limiting example.
Figure 3:
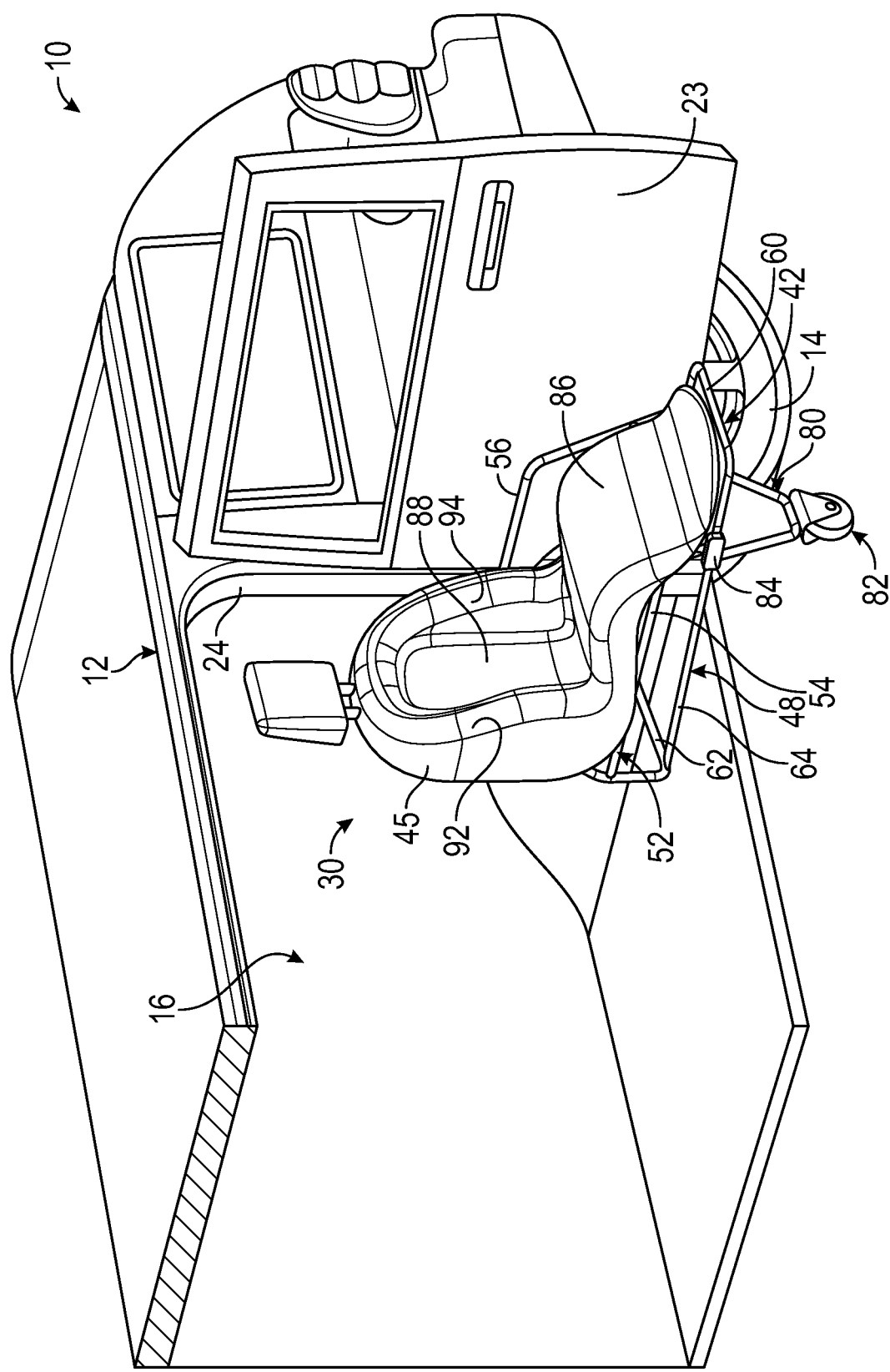
FIG. 3 is a side view of the vehicle of FIG. 1 depicting the revolveable door chair in a second configuration, in accordance with a non-limiting example.

Referring to FIGS. 2 and 3, revolveable door chair 30, in accordance with a non-limiting example, includes a support frame 42 that is pivotably mounted to support pillar 24 and a chair 45 that resides in support frame 42. Chair 45 may simply rest in support frame 42 or, chair 45 may be mechanically connected to support frame 42. Support frame 42 includes a base 48 that is connected to support pillar 24 by a side member 50. Support frame 42 also includes a chair support 52 having a first side support member 54. Support frame 42 also includes a second side support member 56.

Figure 4:
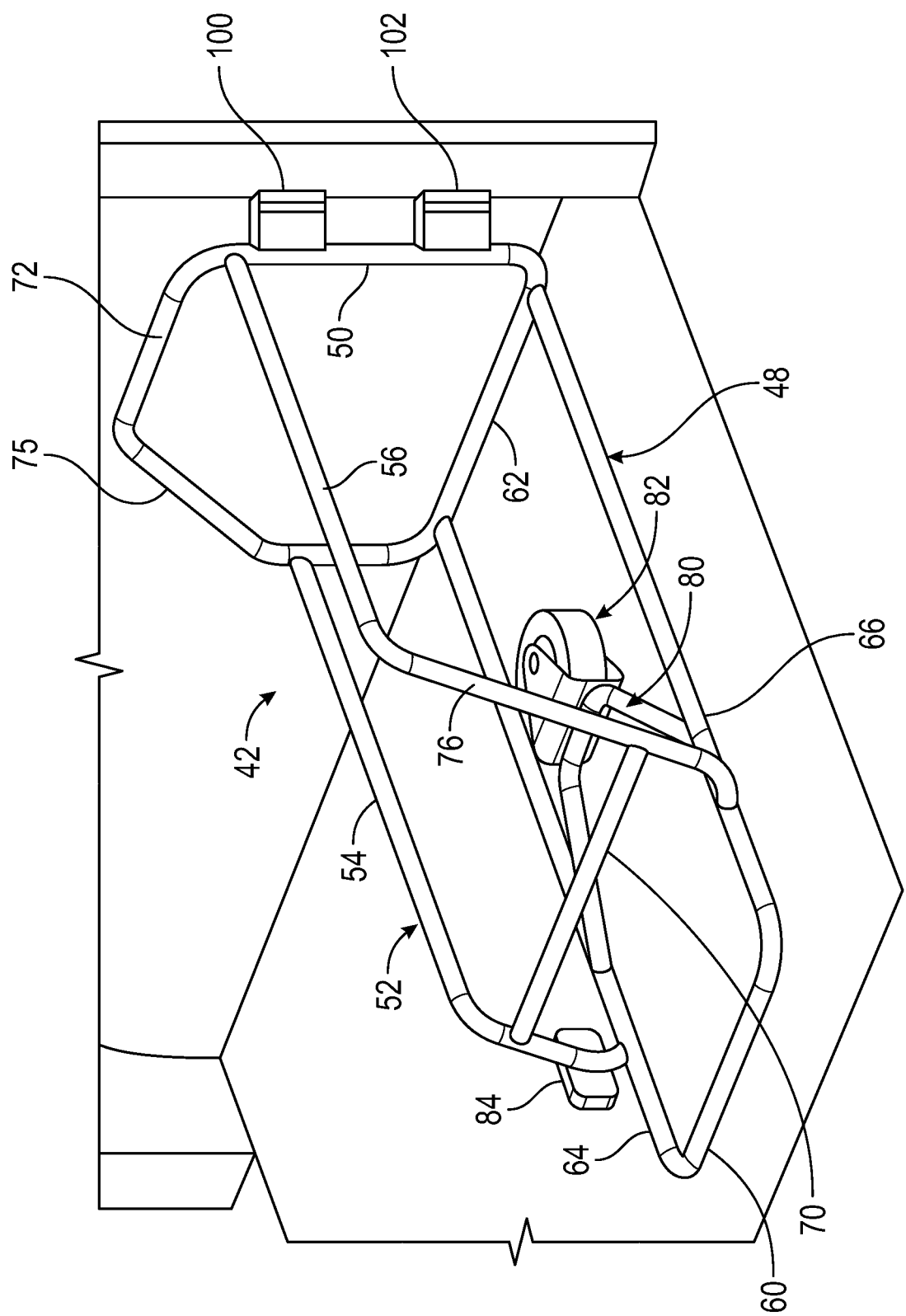
FIG. 4 is a side view of the vehicle of FIG. 1 depicting a revolveable door chair support frame in the first configuration, in accordance with a non-limiting example.
Figure 5:
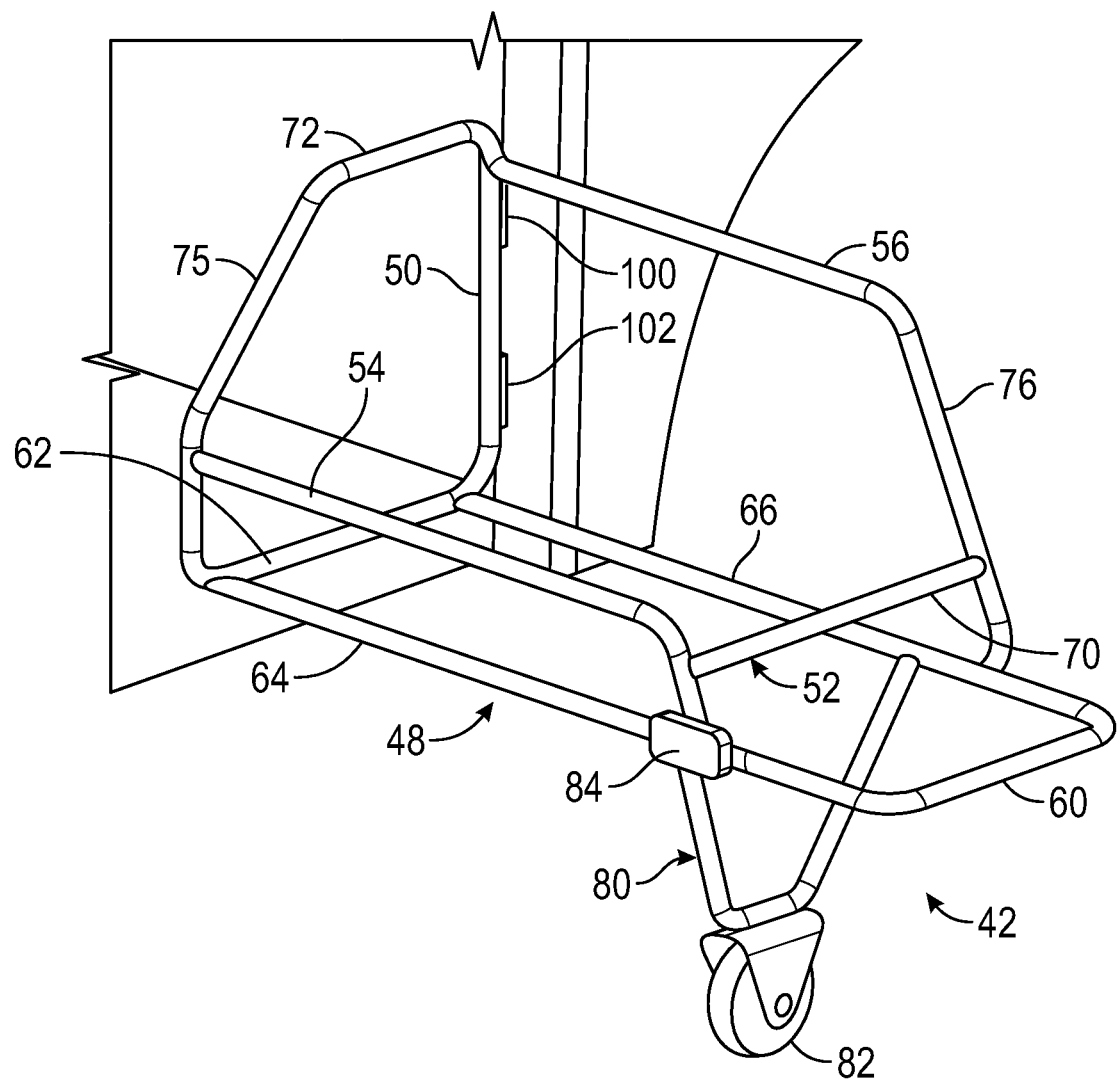
FIG. 5 is a side view of the vehicle of FIG. 4 depicting the revolveable door chair support frame in the second configuration, in accordance with a non-limiting example.

As shown in FIGS. 4 and 5, base 48 includes a first base member 60, a second base member 62 spaced from first base member 60, a third base member 64 extending between and connecting first base member 60 and second base member 62, and a fourth base member 66 spaced from third base member 64 and extending between and connecting first base member 60 and second base member 62. Support frame 42 further includes a front chair support member 70 and a rear chair support member 72.

In a non-limiting example, front chair support member 70 extends substantially parallel to first base member 60 and connects first side support member 54 and second side support member 56. Rear chair support member 72 includes a first angled portion 75 and extends between and connects side member 50 and first side support member 54. A second angled portion 76 extends between second side support member 56 and fourth base member 66. Second angled portion 76 also connects to front chair support member 70.

Support frame 42 is further shown to include a foldable ground support 80 including a wheel 82 that is connected between third base member 64 and fourth base member 66. A lock member 84 is provided at third base member 64 adjacent to front chair support member 70. Lock member 84 secures (e.g., retains) revolveable door chair 30 in passenger compartment 16 as will be detailed herein.

In a non-limiting example, chair 45 includes a seat portion 86 and a back portion 88. Seat portion 86 rests upon base 48, first side support member 54 and front chair support member 70. Back portion 88 rests upon rear chair support member 72 and first angled portion 75. Chair 45 may be secured to support frame 42 through one or more connectors (not shown). In order to provide support for a passenger, back portion 88 includes a first side bolster 92 and a second side bolster 94. First and second side bolsters 92 and 94 extend outwardly from back portion 88.

In a non-limiting example, under normal conditions, (e.g., while vehicle 10 is underway, while vehicle 10 is parked and un-occupied, or other times when loading and/or unloading of passengers is underway), revolveable door chair 30 resides in passenger compartment 16. While in passenger compartment 16, lock member 84 engages a lock element (not shown) to secure revolveable door chair 30. Lock member 84 may engage with a latch, a magnet, or other structure that can prevent movement of support frame 42.

When loading or unloading a passenger, revolveable door chair 30 may pivot or rotate outwardly. Side member 50 is coupled to support pillar 2 through a first hinge 100 and a second hinge 102. That is, lock member 84 is disengaged allowing support frame 42 to rotate about first hinge 100 and second hinge 102. As base 48 leaves passenger compartment 16 ground support 80 drops and wheel 82 rests on a support surface (e.g., the ground) to facilitate outward rotation of support frame 42 and chair 45. At this point, a passenger may alight from chair 45 or step into chair 45. After the passenger is out from or in chair 45, revolveable door chair 30 may be rotated back into passenger compartment 16 and secured. Vehicle 10 may then proceed on a journey.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A revolveable door chair for a vehicle comprising:
a support frame including a base, a side member extending upwardly from the base, and a chair support, the side member being pivotally mounted to a vehicle support;
a ground support leg pivotally connected to the base; and
a chair positioned in the support frame, the chair resting in the chair support.

2. The revolveable door chair according to claim 1, wherein the chair support includes a front chair support member, a rear chair support member, and a first side support member extending between and connecting the front chair support member and the rear chair support member.

3. The revolveable door chair according to claim 2, wherein the front chair support member is spaced from the base a first distance and the rear chair support member is spaced from the base a second distance that is greater than the first distance.

4. The revolveable door chair according to claim 2, wherein the support frame includes a second side support member spaced from the first side support member, the second side support member extending between the front chair support member and the rear chair support member.

5. The revolveable door chair according to claim 4, wherein the first side support member is spaced from the base a first distance and the second side support member is spaced from the base a second distance, the second distance being greater than the first distance.

6. The revolveable door chair according to claim 4, wherein the chair rests on the front chair support member, the rear chair support member, and the first side support member.

7. The revolveable door chair according to claim 6, wherein the chair includes a seat portion and a back portion, the second side support member projecting upwardly beyond the seat portion.

8. The revolveable door chair according to claim 7, wherein the chair includes a first side bolster and a second side bolster that project outwardly of the back portion.

9. The revolveable door chair according to claim 1, wherein the ground support leg includes a wheel.

10. The revolveable door chair according to claim 1, wherein the support frame includes a lock member that selectively secures the revolveable door chair in the vehicle.

11. A vehicle comprising:
a body including a passenger compartment and a support pillar; and
a revolveable door chair pivotally supported in the passenger compartment, the revolveable door chair being selectively rotatable from a first position inside the body and a second position outside of the body, the revolveable door chair including:
a support frame including a base, a side member extending upwardly from the base, and a chair support, the side member being pivotally mounted to a vehicle support;
a ground support leg pivotally connected to the base; and
a chair positioned in the support frame, the chair resting in the chair support.

12. The vehicle according to claim 11, wherein the chair support includes a front chair support member, a rear chair support member, and a first side support member extending between and connecting the front chair support member and the rear chair support member.

13. The vehicle according to claim 12, wherein the front chair support member is spaced from the base a first distance and the rear chair support member is spaced from the base a second distance that is greater than the first distance.

14. The vehicle according to claim 12, wherein the support frame includes a second side support member spaced from the first side support member, the second side support member extending between the front chair support member and the rear chair support member.

15. The vehicle according to claim 14, wherein the first side support member is spaced from the base a first distance and the second side support member is spaced from the base a second distance, the second distance being greater than the first distance.

16. The vehicle according to claim 14, wherein the chair rests on the front chair support member, the rear chair support member, and the first side support member.

17. The vehicle according to claim 16, wherein the chair includes a seat portion and a back portion, the second side support member projecting upwardly beyond the seat portion.

18. The vehicle according to claim 17, wherein the chair includes a first side bolster and a second side bolster that project outwardly of the back portion.

19. The vehicle according to claim 11, wherein the ground support leg includes a wheel.

20. The vehicle according to claim 11, wherein the support frame includes a lock member that selectively secures the revolveable door chair in the vehicle.

* * * * *